United States Patent
Niinobe

(10) Patent No.: US 8,728,224 B2
(45) Date of Patent: May 20, 2014

(54) WATER-SOLUBLE BINDER AND CERAMIC MOLDING COMPOSITION

(75) Inventor: Shingo Niinobe, Joetsu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 551 days.

(21) Appl. No.: 13/004,275

(22) Filed: Jan. 11, 2011

(65) Prior Publication Data

US 2011/0172079 A1    Jul. 14, 2011

(30) Foreign Application Priority Data

Jan. 14, 2010   (JP) ................................ 2010-005424

(51) Int. Cl.
| | |
|---|---|
| C04B 26/28 | (2006.01) |
| C04B 35/636 | (2006.01) |
| C04B 38/00 | (2006.01) |
| C04B 111/34 | (2006.01) |

(52) U.S. Cl.
CPC ......... C04B 38/0006 (2013.01); C04B 35/6365 (2013.01); C04B 26/285 (2013.01); C04B 2111/346 (2013.01)
USPC .................................. 106/197.01; 106/198.1

(58) Field of Classification Search
USPC .......................................... 106/197.01, 198.1
See application file for complete search history.

(56) References Cited

U.S. PATENT DOCUMENTS

| | | | |
|---|---|---|---|
| 3,885,977 A | 5/1975 | Lachman et al. | |
| 6,878,337 B2* | 4/2005 | Noguchi et al. | ................. 419/17 |
| 2008/0262216 A1 | 10/2008 | Hayakawa et al. | |
| 2010/0021610 A1 | 1/2010 | Fukasawa et al. | |
| 2010/0025897 A1 | 2/2010 | Niinobe et al. | |
| 2010/0297301 A1 | 11/2010 | Fukasawa et al. | |
| 2010/0297326 A1 | 11/2010 | Fukasawa et al. | |
| 2011/0077391 A1 | 3/2011 | Hayakawa et al. | |
| 2011/0262690 A1* | 10/2011 | Bayer | ........................... 428/116 |

FOREIGN PATENT DOCUMENTS

| | | |
|---|---|---|
| EP | 1316538 B1 | 6/2003 |
| EP | 1 983 004 A1 | 10/2008 |
| EP | 2 153 724 A1 | 2/2010 |
| EP | 2 157 064 A2 | 2/2010 |
| EP | 2 253 216 A2 | 11/2010 |
| EP | 2 253 217 A2 | 11/2010 |
| JP | 2002-037923 A | 2/2002 |
| JP | 2002-047069 A | 2/2002 |

OTHER PUBLICATIONS

Gobler, J. G. et al "Determination of Alkyl Cellulose Ethers by Gas Chromatography," Talanta, vol. 9 pp. 473-481.

Extended European Search Report mailed Apr. 29, 2013, issued in corresponding European Patent Application No. 11150509.5.

* cited by examiner

*Primary Examiner* — David M Brunsman
(74) *Attorney, Agent, or Firm* — Westerman, Hattori, Daniels & Adrian, LLP

(57) ABSTRACT

A water-soluble binder comprising a water-soluble hydroxypropyl methyl cellulose having a methoxyl substitution of 28-30 wt % and a hydroxypropyl substitution of 5-7 wt % has a syneresis value of at least 30 wt % and a clay heat gel strength of at least 0.5 kgf. A ceramic molding composition comprising a ceramic material and the water-soluble binder has improved shape retention upon drying and is effectively molded into a ceramic part.

3 Claims, No Drawings

WATER-SOLUBLE BINDER AND CERAMIC MOLDING COMPOSITION

CROSS-REFERENCE TO RELATED APPLICATION

This non-provisional application claims priority under 35 U.S.C. §119(a) on Patent Application No. 2010-005424 filed in Japan on Jan. 14, 2010, the entire contents of which are hereby incorporated by reference.

TECHNICAL FIELD

This invention relates to a water-soluble binder having an excellent binding ability and suited for use in ceramic molding, and a ceramic molding composition comprising the binder.

BACKGROUND ART

Water-soluble binders are useful in molding of ceramic compositions because of their advantages attributable to water solubility. While the molding process includes the step of heat drying the ceramic composition, which is loosely bound by the binding force exerted by the water-soluble binder in aqueous solution form, for increasing the bond strength to establish a stable bond, the heat drying step is just to evaporate only water. Unlike those binders in organic solvents which make it necessary to recover the solvent during the drying step for reducing any detrimental effect to the environment, the water-soluble binders dispense with such cumbersome operation.

Exemplary water-soluble binders include starch, polyacrylic acid aqueous solution, polyethylene oxide, alkyl celluloses, hydroxyalkyl celluloses, hydroxyalkyl alkyl celluloses, and the like. Of these, alkyl celluloses are in stark contrast to other water-soluble binders having the drawback that aqueous solutions thereof lose an apparent viscosity upon heating so that the bound shape may fail or alter during drying, in that the alkyl celluloses are able to maintain the bound shape because their aqueous solutions become gel upon heating. Thus drying proceeds in the state bound by the gel. This binding enables to maintain the molded shape. For this reason, the alkyl celluloses are used in ceramic molding, for example, as the binder having a shape-retaining ability during drying.

JP-A 2002-037923 discloses a binder comprising a cellulose ether whose syneresis value is increased by increasing a specific group substitution. The binder has sufficient properties to improve the drying and shape retention of ceramic compositions. JP-A 2002-047069 describes a method for producing a honeycomb structure from an electroconductive ceramic composition, using hydroxypropyl methyl cellulose having a water syneresis value of at least 40 wt %. The method ensures effective drying and inhibits cracking due to shrinkage strain during drying.

The method of JP-A 2002-047069, however, has a problem when it is desired to manufacture a honeycomb shaped part having a thinner wall or a higher porogen content. Albeit effective drying due to high syneresis, shape retention during drying (or shrinkage) is insufficient. Deformation or cracking can occur during drying. This phenomenon becomes outstanding particularly with electroconductive ceramic compositions. It would thus be desirable to have a water-soluble binder having a good profile of rapid drying and shape retention due to heat gelation during drying, and to prepare such a binder at low costs including raw material costs.

CITATION LIST

Patent Document 1: JP-A 2002-037923
Patent Document 2: JP-A 2002-047069 (U.S. Pat. No. 6,878,337, EP 1316538)

SUMMARY OF INVENTION

An object of the invention is to provide a water-soluble binder for use in ceramic molding which is excellent in both drying and shape retention during drying and has a binding ability sufficient to improve molding operation. Another object is to provide a ceramic molding composition comprising the binder.

The inventor has found that when a binder mainly comprising a specific water-soluble hydroxypropyl methyl cellulose is mixed with a water-insoluble ceramic material to form a ceramic molding composition, a uniform ceramic structure can be rapidly prepared therefrom, independent of the identity of the water-insoluble ceramic material and without failures like deformation and cracks during drying.

In one aspect, the invention provides a water-soluble binder for use in ceramic molding, comprising a water-soluble hydroxypropyl methyl cellulose having a methoxyl substitution of 28 to 30 wt % and a hydroxypropyl substitution of 5 to 7 wt %, wherein the binder has a syneresis value in aqueous solution form of at least 30 wt % and a clay heat gel strength of at least 0.5 kgf.

Preferably the water-soluble hydroxypropyl methyl cellulose forms a 2 wt % aqueous solution having a viscosity of at least 10,000 mPa-s at 20° C. as measured by a Ubbelohde viscometer according to JIS K-2283-1993.

In another aspect, the invention provides a ceramic molding composition comprising the water-soluble binder defined above, a ceramic material, and optionally, at least one inorganic material selected from the group consisting of copper, nickel, iron, chromium, aluminum, metal silicon, lanthanide metals, alkaline earth metals, and alloys thereof.

ADVANTAGEOUS EFFECTS OF INVENTION

The water-soluble binder of the invention is advantageously used in ceramic molding. From a ceramic molding composition comprising the binder, ceramic parts can be produced with the advantage of shape retention during drying.

DESCRIPTION OF EMBODIMENTS

The water-soluble binder for use in ceramic molding comprises a hydroxypropyl methyl cellulose having a methoxyl substitution of 28 to 30 wt % and a hydroxypropyl substitution of 5 to 7 wt %. This cellulose exhibits a high syneresis value and a high clay heat gel strength and constitutes an effective binder. The degree of substitution can be determined according to the Zeisel-GC method described in J. G. Gobler, E. P. Samsel, and G. H. Beaber, Talanta, 9, 474 (1962).

The water-soluble hydroxypropyl methyl cellulose should have a syneresis value of at least 30 wt %, preferably 30 to 50 wt %, and more preferably 32 to 45 wt %. If the syneresis value is less than 30 wt %, the gel tends to trap more water therein, resulting in a low heat drying rate.

As used herein, the term "syneresis" refers to the separation of water from a gel due to contraction of the gel, and the "syneresis value" of a cellulose refers to a percentage of the total weight of water and water vapor exuded from a cellulose gel divided by the weight of the gel. Specifically, 30 g of 2.5 wt % aqueous solution of water-soluble hydroxypropyl methyl cellulose kept at 20° C. is placed in a 30-ml beaker and heated in a household microwave oven (max. 600 W) at the low power (about 180 W) for 3 minutes to form a gel. The gel is weighed, then transferred to a petri dish and heated in the microwave oven under the same conditions for 4 minutes. At this point, the total weight of the water and water vapor separated from the gel is measured.

The water-soluble hydroxypropyl methyl cellulose should have a clay heat gel strength of at least 0.5 kgf, preferably 0.5 to 2.0 kgf, and more preferably 0.7 to 1.5 kgf. If the gel strength is less than 0.5 kgf, deformation or cracking occurs during drying, resulting in low yields.

As used herein, the term "clay heat gel strength" refers to a load needed for probe penetration into a clay sample. The sample is obtained by preparing a clay as described below, placing the clay at 20° C. in a 50-ml beaker, and heating at 90° C. in a hot water bath for 2 hours. Using a rheometer (Rheotech K.K.), a load applied for a probe with a diameter of 3 mm to penetrate the sample at a rate of 5 mm/min to a depth of 20 mm is measured.

The (kneaded) clay is prepared by combining 80 parts by weight of silicon carbide having an average particle size of 33 μm, 20 parts by weight of metal silicon having an average particle size of 5 μm, 8 parts by weight of water-soluble hydroxypropyl methyl cellulose, 26 parts by weight of water, and 2.5 parts by weight of 30 wt % potassium laurate aqueous solution, and kneading the contents.

A solution of the water-soluble hydroxypropyl methyl cellulose should preferably have an appropriate viscosity because it is used as a binder in ceramic molding. The viscosity of the solution may be controlled by adjusting the binder concentration. Since the binder capable of imparting the required viscosity in a relatively low concentration is preferred from the economical aspect, the hydroxypropyl methyl cellulose should preferably form a 2 wt % aqueous solution having a viscosity of at least 10,000 mPa-s, more preferably at least 20,000 mPa-s at 20° C. as measured by a Ubbelohde viscometer according to JIS K-2283-1993.

Cellulose ethers are generally prepared by starting with natural cellulose. Known celluloses have a maximum molecular weight of about 1,500,000. It is expected that a cellulose ether prepared from such cellulose has a viscosity of about 400,000 mPa-s at maximum as measured by the above method.

The method of preparing water-soluble hydroxypropyl methyl cellulose is not particularly limited. For example, a cellulose ether having a certain degree of substitution and viscosity may be obtained as white solid powder by contacting an alkaline solution with a high-purity refined pulp to form alkali cellulose, effecting etherification using an etherifying agent, washing with hot water, drying, and grinding. A desired cellulose ether may be obtained by optimizing the viscosity and the degree of substitution. The former can be controlled by selecting a degree of polymerization of the starting material, pulp and the latter can be controlled by adjusting the amounts of the alkaline solution and the etherifying agent.

Also contemplated herein is a ceramic molding composition comprising a water-soluble binder comprising the water-soluble hydroxypropyl methyl cellulose defined above and a ceramic material.

It is preferred from the aspects of shape retention, moldability, and cost that the water-soluble binder be added in an amount of 2 to 20 parts by weight, more preferably 3 to 15 parts by weight, and even more preferably 4 to 8 parts by weight based on 100 parts by weight of the total amount of the ceramic material and the optional inorganic material described later.

The ceramic material encompasses those materials which form glass ceramics or ceramics upon firing. Examples include cordierites described in U.S. Pat. No. 3,885,977, mullite, clays such as bentonite, talc, zircon, zirconia, spinel, alumina, and precursors thereof, carbides (e.g., silicon carbide), nitrides (e.g., silicon nitride), silicates, aluminates, lithium aluminosilicate, alumina, silica, titania, aluminum titanate, fused silica, borides, soda lime, aluminosilicate, borosilicate, and soda-barium silicate. The ceramic material is preferably added from the viewpoint of the heat resistance of molded parts in an amount of 50 to 100 wt %, more preferably 60 to 95 wt %, and even more preferably 75 to 85 wt % when the total weight of the ceramic material and the optional inorganic material is 100 wt %.

An inorganic material may also added to the ceramic molding composition. Examples include copper, nickel, iron, chromium, aluminum, metal silicon, lanthanide metals, alkaline earth metals, and alloys of two or more of these metals. The inorganic material is preferably added from the viewpoint of the firing temperature of molded parts and binding of ceramic material in an amount of 0 to 50 wt %, more preferably 5 to 30 wt %, and even more preferably 15 to 25 wt % when the total weight of the ceramic material and the optional inorganic material is 100 wt %.

Water is added preferably in an amount of 10 to 50 parts by weight, more preferably 15 to 40 parts by weight, and even more preferably 20 to 30 parts by weight based on 100 parts by weight of the total amount of the ceramic material and the optional inorganic material.

The method for producing ceramic molded parts using the ceramic molding composition is described. The ceramic molding composition is prepared by dry blending a ceramic material with water-soluble hydroxypropyl methyl cellulose, adding water and other components to the mixture, and wet blending. The resulting ceramic molding composition is kneaded in a kneader. The kneaded ceramic molding composition may be molded into a green part of any desired shape by any suitable shaping method such as extrusion molding, injection molding, slurry casting or doctor blade sheet forming. The ceramic molding composition containing the water-soluble binder is effective particularly when the extrusion and injection molding techniques are used because it is important for these techniques that the shape as molded is maintained until the drying step. The molded part is then dried at 60 to 150° C.

EXAMPLE

Examples of the invention are given below by way of illustration and not by way of limitation.

Examples and Comparatives

A mixture was formed of 80 parts by weight of silicon carbide having an average particle size of 33 μm and 20 parts by weight of metal silicon having an average particle size of 5 μm. Total 100 parts by weight of the mixture was combined with 8 parts by weight of cellulose ether shown in Table 1 and mixed. Further 26 parts by weight of water and 2.5 parts by weight of 30 wt % potassium laurate aqueous solution were added. The mixture was mixed on a Super-Mixer (Kawada Mfg. Co., Ltd.) with an impeller operating at 1,000 rpm and then milled at 15° C. on a compact three-roll mill (Inoue Mfg. Co., Ltd.). The resulting clay was extrusion molded into a green honeycomb structure, using a laboratory extrusion molding machine (Miyazaki Iron Works Co., Ltd.) with a honeycomb die having a rib gage of 0.5 mm, a rib spacing of 2.5 mm, and a diameter of 20 mm. The green structure was dried at 100° C. for 16 hours, after which it was examined for deformation during drying.

TABLE 1

|  | Viscosity at 20° C. of 2 wt % aqueous solution, mPa-s | Methoxyl substitution, wt % | Hydroxypropyl substitution, wt % | Heat gel strength, kgf | Release water ratio, wt % | Drying |
|---|---|---|---|---|---|---|
| Example 1 | 75,000 | 28.0 | 6.5 | 1.50 | 38 | ○ |
| Example 2 | 50,000 | 28.5 | 5.5 | 1.20 | 32 | ○ |
| Example 3 | 30,000 | 28.0 | 6.9 | 0.70 | 42 | ○ |
| Example 4 | 10,000 | 28.0 | 5.0 | 1.00 | 30 | ○ |
| Comparative Example 1 | 75,000 | 23.0 | 6.5 | 0.20 | 10 | X |
| Comparative Example 2 | 30,000 | 29.0 | 10.0 | 0.45 | 50 | X |
| Comparative Example 3 | 10,000 | 28.0 | 4.0 | 1.80 | 25 | X |

○: Very good without deformation and cracks
X: Deformed and cracked

It is apparent from the results shown in Table 1 that the water-soluble binder of the invention has a high release water ratio which ensures rapid and uniform drying and also has a high clay heat gel strength which ensures that molded parts do not deform or crack during drying.

Japanese Patent Application No. 2010-005424 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A ceramic molding composition comprising a water-soluble binder comprising a water-soluble hydroxypropyl methyl cellulose having a methoxyl substitution of 28 to 30 wt % and a hydroxypropyl substitution of 5 to 7 wt %, and a ceramic material,
wherein the binder has a syneresis value in aqueous solution form of at least 30 wt % and a clay heat gel strength of at least 0.5 kgf, and
wherein the term "syneresis" refers to the separation of water from a gel due to contraction of the gel, and the "syneresis value" of a cellulose refers to a percentage of the total weight of water and water vapor exuded from a cellulose gel divided by the weight of the gel, and is obtained by the method that 30 g of 2.5 wt % aqueous solution of water-soluble hydroxypropyl methyl cellulose kept at 20° C. is placed in a 30-ml beaker and heated in a household microwave oven (max. 600 W) at the low power (about 180 W) for 3 minutes to form a gel, the gel is weighed, then transferred to a petri dish and heated in the microwave oven under the same conditions for 4 minutes, and at this point, the total weight of the water and water vapor separated from the gel is measured.

2. The composition of claim 1, further comprising at least one inorganic material selected from the group consisting of copper, nickel, iron, chromium, aluminum, metal silicon, lanthanide metals, alkaline earth metals, and alloys thereof.

3. The composition of claim 1 or 2 wherein water-soluble hydroxypropyl methyl cellulose forms a 2 wt % aqueous solution having a viscosity of at least 10,000 mPa-s at 20° C. as measured by a Ubbelohde viscometer according to JIS K-2283-1993.

* * * * *